United States Patent [19]
Hsu

[11] Patent Number: 6,038,328
[45] Date of Patent: Mar. 14, 2000

[54] MINIMIZATION OF ACOUSTIC ECHO EFFECTS IN A MICROPHONE BOOT

[75] Inventor: Roger Hsu, San Diego, Calif.

[73] Assignee: Hughes Electronics Corporation, El Segundo, Calif.

[21] Appl. No.: 08/889,168

[22] Filed: Jul. 7, 1997

[51] Int. Cl.[7] .............................. H04R 9/08; H04R 11/04
[52] U.S. Cl. .................... 381/361; 379/428; 379/433; 381/355
[58] Field of Search ..................................... 379/428, 429, 379/433; 381/355, 356, 357, 359, 360, 358, 365, 369, 375, 344, 354, 91, 93, 95, 361; 455/90

[56] References Cited

U.S. PATENT DOCUMENTS

| | | | |
|---|---|---|---|
| 5,204,907 | 4/1993 | Staple et al. | 381/91 |
| 5,210,793 | 5/1993 | Carlson et al. | 381/355 |
| 5,263,093 | 11/1993 | Nakamura et al. | 381/168 |
| 5,615,273 | 3/1997 | Lucey et al. | 381/355 |
| 5,701,354 | 12/1997 | Komoda et al. | 381/355 |

*Primary Examiner*—Paul Loomis
*Assistant Examiner*—Rexford N. Barnie
*Attorney, Agent, or Firm*—John T. Whelan; Michael W. Sales

[57] ABSTRACT

A microphone boot system for reducing acoustic echo effect has a first compression structure; a first member of a microphone boot pressing against the first compression structure; second member of the microphone boot pressing against the first member of the microphone boot at an interface; a microphone interposed within a cavity formed by the first member of the microphone boot and the second member of the microphone boot; and a second compression structure juxtaposed against the second member of the microphone boot, such that the first compression structure and the second compression structure acting in concert form an acoustic seal at the interface. A method of reducing acoustic echo effect involves forming a first member of a microphone boot; forming a second member of a microphone boot; interposing a microphone between the first member of the microphone boot and the second member of the microphone boot; and applying a compressive force to the first member of the microphone boot and the second member of the microphone boot so as to form an acoustic seal between the first member of the microphone boot and the second member of the microphone boot at an interface thereinbetween.

17 Claims, 2 Drawing Sheets

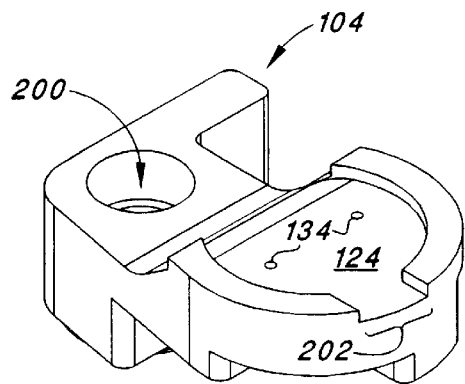
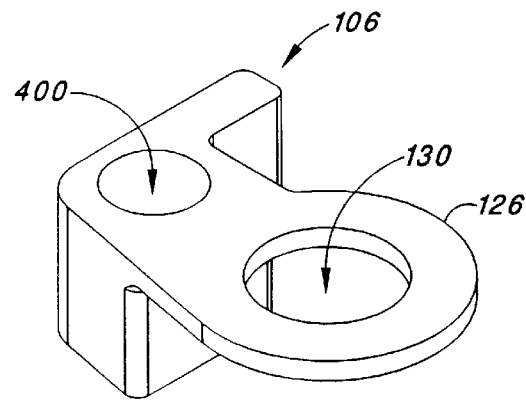
FIG. 2
FIG. 4
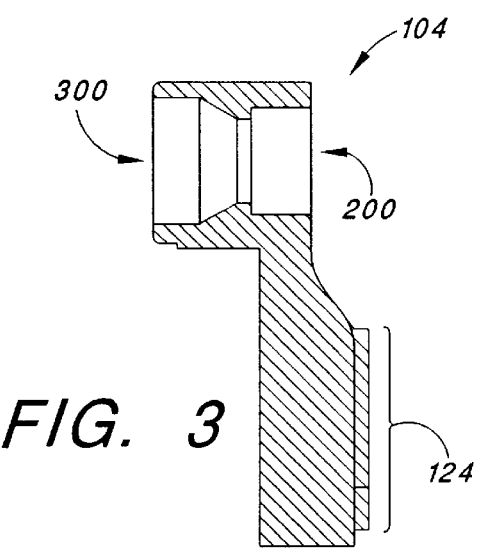
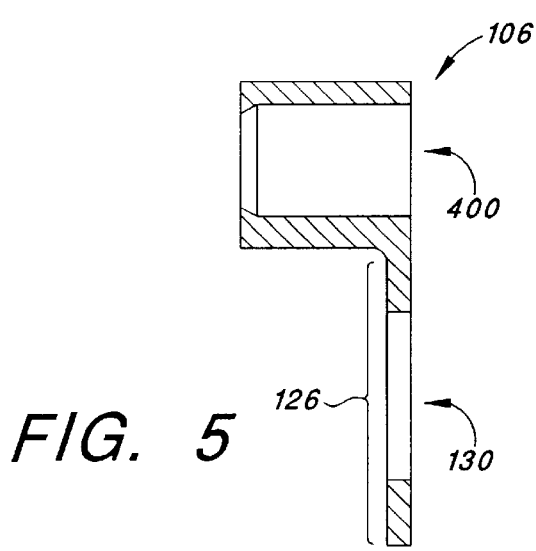
FIG. 3
FIG. 5
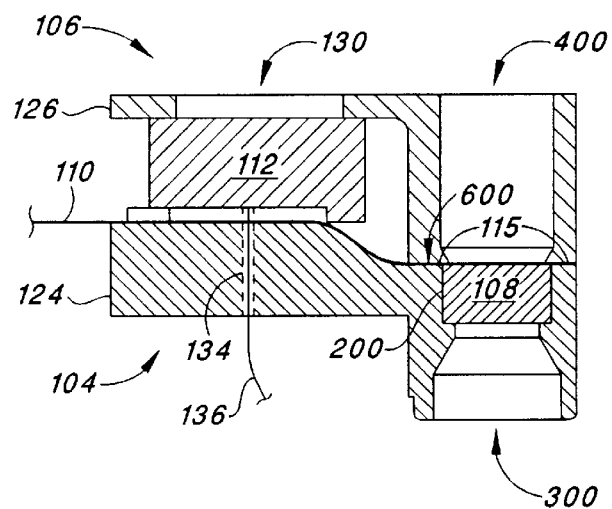
FIG. 6

MINIMIZATION OF ACOUSTIC ECHO EFFECTS IN A MICROPHONE BOOT

BACKGROUND OF THE INVENTION

The present invention relates to minimizing acoustic echo effects, and more particularly to minimizing acoustic echo effects in a microphone boot. Even more particularly, the present invention relates to minimizing acoustic echo effects in a noise canceling microphone boot for a portable radio, such as a portable cellular telephone.

A major challenge faced by the designer of portable radios, such as portable cellular telephones is posed by what is known as "acoustic echo effect". This effect occurs when sound emitted from a speaker in a portable radio is transmitted to and received by a microphone in the same portable radio. For example, when a first person is talking to a second person, as the first person's voice is emitted from the speaker in the second person's portable radio, it may be picked up by a microphone in the second person's portable radio, and consequently, transmitted back to the first person. Absent any mechanism for minimizing or preventing "acoustic echo effect", the results of this transmission back to the first person is that the first person's voice is emitted from the speaker of the first person's portable radio, thus "echoing" the first person's own voice transmissions.

Acoustic echo effect is problematic in portable radios, such as portable cellular telephones, because of their small size and thus short distance between the microphone and speaker, and is particularly problematic in digital portable radios, such as digital cellular telephones (e.g., TDMA, CDMA, GSN and the like), and even more problematic in satellite transceivers, because of the greater delays present in digital and satellite environments. Although it is inevitable that some sound emitted from a speaker in a portable radio will be picked up by a microphone in the same portable radio, acoustic echo effect can be minimized through an effective seal around the microphone within such portable radio's housing. This seal serves to minimize the amount of sound entering the microphone from within the portable radio's housing, which accounts for the majority of acoustic echo effect. As a result, most portable radios employ a "boot" made from rubber-like material that encloses its microphone and provides a seal against plastic housings of the portable radio so as to prevent sound from entering the microphone from within the plastic housings.

Boot designs commonly employed tradeoff performance (i.e., effectivity of the seal formed around the microphone) for manufacturablity (i.e., ease and speed of assembly), or vice versa. The primary reason for this tradeoff is that the microphone typically requires two leads (either in the form of wires or a thin plastic flex conductor in which a pair of conductors are encompassed or on which such conductors are fused) in order to connect the microphone with a circuit board within the plastic housings. As a result, there is generally a compromise in the integrity of the seal at the point or points from which these two leads emerge from the boot. If the point or points at which the leads emerge is sealed well, then assembly becomes highly difficult, because the leads must be squeezed through tight openings in the microphone's boot. On the other hand, if the point or points at which the leads emerge is not sealed well, then assembly is simplified, but acoustic echo may be worsened because sound is able to enter the microphone through these points.

The present invention advantageously addresses the above and other needs.

SUMMARY OF THE INVENTION

The present invention advantageously addresses the needs above as well as other needs by providing an approach to minimizing acoustic echo effects in a microphone boot.

In on embodiment, the invention can be characterized as a microphone boot system for reducing acoustic echo effect. The microphone boot system has a first compression structure, such as a front housing; a first member of a microphone boot pressing against the first compression structure; a second member of the microphone boot pressing against the first member of the microphone boot at an interface; a microphone interposed within a cavity formed by the first member of the microphone boot and the second member of the microphone boot, such as in a recess within the first member of the microphone boot, and preferably enveloping the microphone within the first member of the microphone boot and the second member of the microphone boot; and a second compression structure, such as a rear housing pressing against the second member of the microphone boot, such that the first compression structure and the second compression structure acting in concert form an acoustic seal at the interface. Preferably also, the first member of the microphone boot and the first compression structure, and the second member of the microphone boot and the second compression structure form respective acoustic seals thereinbetween as well.

In a variation of the above embodiment, the microphone boot system has an electrical conductor coupled to the microphone. The electrical conductor is interposed between the first member of the microphone boot and the second member of the microphone boot at the interface between the first member of the microphone boot and the second member of the microphone boot. The electrical conductor is preferably a flex conductor, and preferably is fashioned to form a radial flange around one end of the microphone that occupies the interface region, with the first member of the microphone boot and the second number of the microphone boot forming respective seals on either side of the flange.

In another embodiment, the present invention can be characterized as a method of reducing acoustic echo effect. The method involves forming a first member of a microphone boot; forming a second member of a microphone boot; interposing a microphone between the first member of the microphone boot and the second member of the microphone boot; and applying a compressive force to the first member of the microphone boot and the second member of the microphone boot so as to form an acoustic seal between the first member of the microphone boot and the second member of the microphone boot at an interface thereinbetween. Preferably, also, respective acoustic seals are formed between a first housing member and the first member of the microphone boot, and between the second housing member and the second member of the microphone boot when the first housing and the second housing are assembled and thereby apply the compressive force to the first member of the microphone boot and the second member of the microphone boot.

In a variation, the method also involves interposing a conductor between the first member of the microphone boot and the second member of the microphone boot at the interface region, and preferably interposing a flex conductor that forms a radial flange at one end of the microphone between the first member of the microphone boot and the second member of the microphone boot and wherein the seal is formed on respective sides of the radial flange by the first member of the microphone boot and the second member of the microphone boot.

BRIEF DESCRIPTION OF THE DRAWINGS

The above and other aspects, features and advantages of the present invention will be more apparent from the following more particular description thereof, presented in conjunction with the following drawings wherein:

FIG. 2 is a perspective view of a lower member of the microphone boot of FIG. 1;

FIG. 3 is side view of the lower member of the microphone boot of FIG. 2;

FIG. 4 is a perspective view of an upper member of the microphone boot of FIG. 1;

FIG. 5 is a side view of the upper member of the microphone boot of FIG. 4; and

FIG. 6 is a side view of the upper and lower members of the microphone boot of FIG's 2 through 5, assembled together with the microphone and ringer of FIG. 1.

Corresponding reference characters indicate corresponding components throughout the several views of the drawings.

DETAILED DESCRIPTION OF THE PREFERRED EMBODIMENTS

Figure 1:
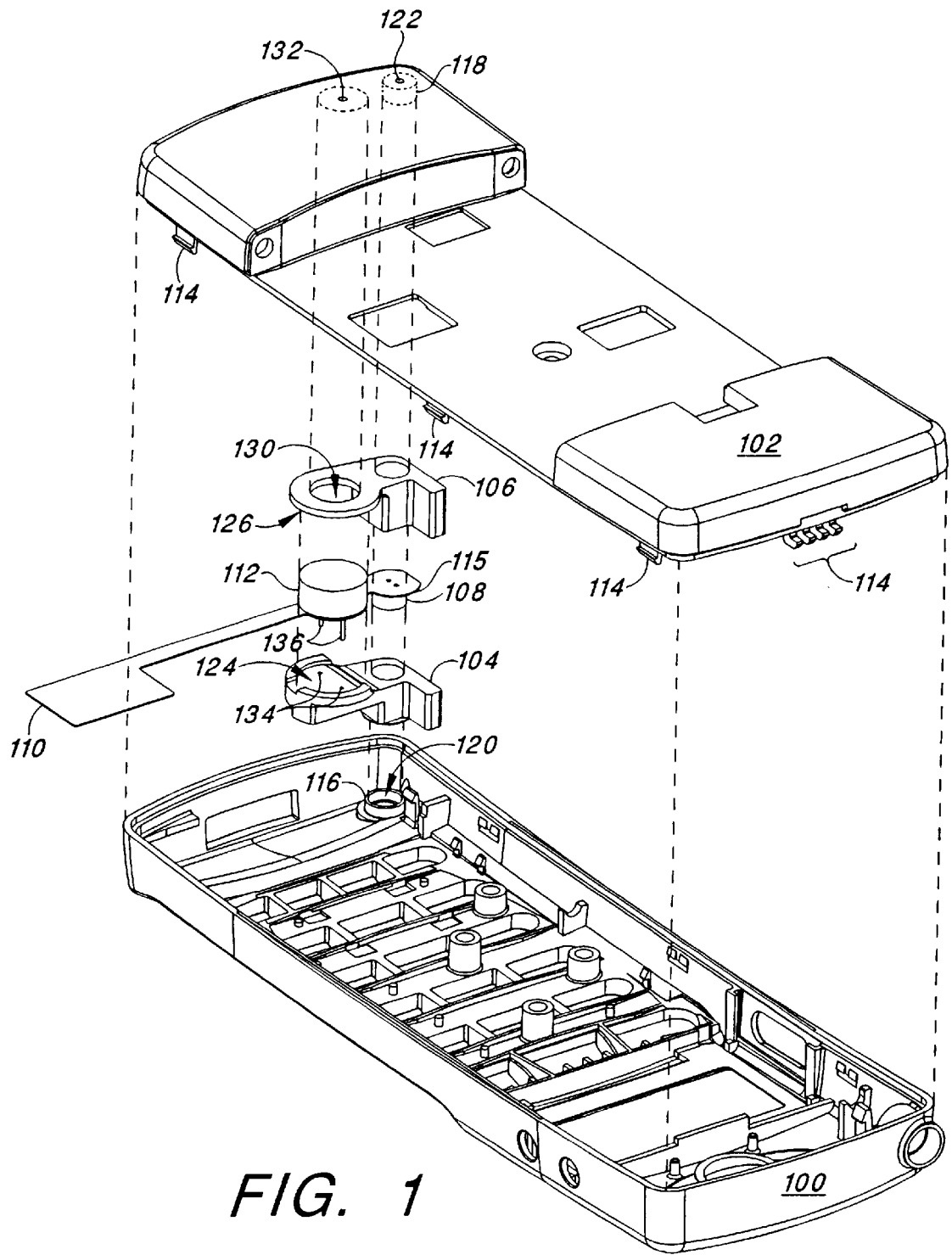
FIG. 1 is a perspective view of a portable radio and microphone boot assembly, including a microphone and a ringer, in accordance with one embodiment of the present invention.

The following description of the presently contemplated best mode of practicing the invention is not to be taken in a Limiting sense, but is made merely for the purpose of describing the general principles of the invention. The scope of the invention should be determined with reference to the claims.

Referring first to FIG. 1, shown are an upper housing 100, a lower housing 102, an upper member 104 of a microphone boot, a lower member 106 of a microphone boot, a microphone 108, a flex conductor 110, and a ringer 112.

As can be seen, as represented by dashed lines, the upper and lower housings 100, 102 snap together and are secured in place by tabs 114, such as is known in the art. In the process of snapping the housings 100, 102 together, the upper and lower members of the microphone boot 104, 106, which are sized to be slightly larger, i.e., from, for example, between 0.01 and 0.03 inches of interference, than a space between a sound directing structure 116 in the upper housing 100 and the sound directing structure 118 in the lower housing 102, so as to compress the upper and lower members 104, 106 of the microphone boot together upon assembly of the upper and lower housings 100, 102. Preferably, Butyl rubber is used to make the upper and lower members of the microphone boot 104, 106, however, numerous materials with acoustic insulating properties can be used within the scope of the present embodiment. The sound directing structures 104, 106 of the upper and lower housings lead to respective sound ports 120, 122 through which sound enters the upper and lower housings 100, 102. From the sound directing structures 120, 122, the sound entering the upper and lower housings 100, 102 is directed respectively, through the upper and lower members 104, 106 of the microphone boot to the microphone 108. A radial flange 115 formed from the flex conductor 110 is adjacent to one end of the microphone 108 and the microphone 108 is compressed between and held within the upper and lower members 104, 106 of the microphone boot, which form respective seals against respective sides of the radial flange formed by the flex conductor 110 at one end of the microphone 108 such that sound is not able to or is highly impeded from entering the microphone boot other than through the sound ports 120, 122 in the upper and lower housings 100, 102.

The compression applied to the upper and lower members 104, 106 of the microphone boot is sufficient to form the seals against the respective sides of the radial flange formed 115 by the flex conductor 110 adjacent to one end of the microphone 108 at the interface of the upper member 104 of the microphone boot and the lower member 106 of the microphone boot. The radial flange 115 occupies the interface region between the upper member of the microphone boot 104 and the lower member of the microphone boot 106. The flex conductor 110 also electrically couples the microphone 108 to circuits (not shown) within the housing 100, 102, such as portable radio circuits. The compression applied to the upper and lower members 104, 106 of the microphone boot is as a result of the upper member of the microphone boot 104 and the lower member of the microphone boot 106 being slightly larger than the space between the upper sound directing structure 116 and the lower sound directing structure, such as an interface of from between about 0.01 inches and 0.03 inches.

Also shown is a ringer 112, which in the present embodiment also supported by the microphone boot between an upper ringer supporting structure 124 of the upper member 104 of the microphone boot, and a lower ringer supporting structure 126 of the lower member 106 of the microphone boot. In the embodiment shown, the flex conductor 110 from the microphone 108 passes between the upper ringer supporting structure 124 and the ringer 112, which serves to hold the flex conductor 110 securely in place, and prevent stresses on the flex conductor 110 from jeopardizing the integrity of the seal around the microphone 108, as formed by the upper and lower members 104, 106 of the microphone boot.

The lower ringer supporting structure 126 includes an opening 130, which upon assembly of the upper and lower members 104, 106 of the microphone boot and the upper and lower housings 100, 102, is adjacent to a ringer port 132 through which sound emanating from the ringer 112 exits the lower housing 102, so as to notify a user that, for example, an incoming call is being received.

Wires 136 connecting the ringer 112 to circuits within the upper and lower housing 102, 104 pass through and make electrical contact with the flex conductor 110 and pass into clearance holes 134, 136 in the upper ringer supporting structure 124. The wires 136 are connected to, e.g., soldered to, respective conductors within the flex conductor by piercing through the flex conductor 110 at such conductors.

Referring next to FIG. 2, shown is the upper member 104 of the microphone boot, including the upper ringer supporting structure 124. Also shown is a hole 200 into which the microphone is placed during assembly, the holes 134 through which the wires of the ringer pass, and a notch 202 through which the flex conductor passes.

Referring next to FIG. 3, shown is the upper member 104 of the microphone boot, including the upper ringer supporting structure 124, the opening 200 into which the microphone is placed, and an opening 300 that directs sound from the upper sound port into the microphone, as channeled by the upper sound directing structure.

Referring next to FIG. 4, shown is the lower member 106 of the microphone boot, including the lower ringer supporting structure 126, as well as an opening 400 into which sound entering the lower sound port is channeled into the microphone by the lower sound directing structure.

Referring next to FIG. 5, shown are the lower member 106 of the microphone boot, including the lower ringer supporting structure 126, the opening 130 in the lower ringer supporting structure, and the opening 400 in the lower member of the microphone boot through which sound from the lower sound port is directed by the sound directing structure.

Referring next to FIG. 6, shown are the upper and lower members 104, 106 of the microphone boot, including the opening 200 into which the microphone is inserted, the opening 300 in the lower member of the microphone boot into which sound enters from the lower sound port, and the opening 400 in the lower member of the microphone boot through which sound enters from the upper microphone port. Also shown are the flex conductor 110, the microphone 108, the ringer 112, the upper and lower ringer supporting structures 124, 126, the opening 130 in the lower ringer supporting structure through which sound from the ringer 112 exits into and through the ringer port, and one of the holes 134 in the upper ringer supporting structure 124 into which one of the wires 136 connected to the ringer 112 passes.

In operation, a seal 600 is formed around the microphone at the intersection (or interface) of the upper member 104 of the microphone boot, and the lower member 106 of microphone boot, which form respective seals against respective sides of the radial flange 115 formed by the flex conductor at one end of the microphone 108 so as to prevent or impede sound emanating from within the upper and lower housings from entering the microphone 108. Such sound can, for example, come from a speaker located within the upper and lower housings and is the predominant source of the acoustic echo effect.

Advantageously, no tedious threading of microphone wires through tiny holes is needed to assemble the microphone boot, because the flex conductor 110 is an integral part of the seal 600 at the interface and passes out toward the ringer 112, without any breaking of the seals such as would be necessary to provide passage for wires out of the microphone boot. This advantageous feature is as a result of the fact that, in accordance with the present embodiment, the seals are formed by the juxtaposition of relatively flat surfaces of the upper member of the microphone boot 106 and one side of the flex conductor 110 and the juxtaposition of relatively flat surfaces of the lower member of the microphone boot 104 and another side of the flex conductor 110, thus sandwiching the flex conductor 110 between the upper and lower members 104, 106 of the microphone boot. Further advantageously, the seal 600 is formed when the upper and loser housings are snapped together as a result of compressive forces imposed on the microphone boot by the upper and lower sound directing structures and the upper and lower housings. Advantageously, assembly of the upper and lower housings in this way is not only an already necessary step, but also a quick and simple step as compared to the tedium of threading wires through holes.

While the invention herein disclosed has been described by means of specific embodiments and applications thereof, numerous modifications and variations could be made thereto by those skilled in the art without departing from the scope of the invention set forth in the claims.

What is claimed is:

1. A microphone boot system for reducing acoustic echo effect comprising:
   a first compression structure;
   a first member of a microphone boot juxtaposed against the first compressive structure;
   a second member of the microphone boot completely, acoustically sealingly pressing against the first member of the microphone boot at an interface therebetween;
   a microphone interposed within a cavity formed by the first member of the microphone boot and the second member of the microphone boot, the interface encircling the microphone;
   a second compression structure juxtaposed against the second member of the microphone boot, the first compression structure and the second compression structure acting in concert to cause said completely acoustically sealingly pressing and to thereby form an acoustic seal all along the interface; and
   an electrical conductor coupled to said microphone, and being acoustically sealingly interposed between said first member of said microphone boot and said second member of said microphone boot at said interface.

2. The microphone boot system of claim 1 wherein said electrical conductor comprises:
   a flex conductor including said electrical conductor.

3. The microphone system of claim 1 further comprising:
   a radial flange extending from said microphone, the radial flange being interposed between said first member of said microphone boot and said second member of said microphone boot.

4. The microphone boot system of claim 3 further comprising:
   a flex conductor including said electrical conductor and forming said radial flange at one end of the microphone.

5. The microphone boot system of claim 4 further comprising:
   a first audio passage in said first member of said microphone boot, the first audio passage providing a conduit through which audio waves reach said microphone.

6. The microphone boot system of claim 5 further comprising:
   a second audio passage in said second member of said microphone boot, the second audio passage providing an additional conduit through which audio waves reach said microphone.

7. The microphone boot system of claim 6 further comprising:
   a first audio port, coupled to said first audio passage, in said first compression structure;
   a second audio port, coupled to said second audio passage, in said second compression structure.

8. The microphone boot system of claim 7 wherein said first, compression structure comprises a front housing member, and said second compression structure comprises a back housing member.

9. The microphone boot system of claim 8 wherein said first member of said microphone boot includes a first ringer supporting structure, and wherein said second member of said microphone boot includes a second ringer supporting structure.

10. The microphone boot system of claim 9 further comprising:
    a ringer juxtaposed between said first ringer supporting structure, and said second ringer supporting structure.

11. The microphone boot system of claim 1 further comprising:
    a radial flange extending from said microphone, the radial flange being interposed between said first member of said microphone boot and said second member of said microphone boot.

12. A method of reducing acoustic echo effect comprising:
    forming a first member of a microphone boot;

forming a second member of a microphone boot;

interposing a microphone within a cavity formed by the first member of the microphone boot and the second member of the microphone boot;

applying a compressive force to the first member of the microphone boot and, the second member of the microphone boot so as to form an acoustic seal between the first member of the microphone boot and the second member of the microphone boot at an interface thereinbetween; and acoustically sealingly interposing an electrical conductor, coupled to the microphone, between the first member of the microphone boot and the second member of the microphone boot at the interface.

13. A method of reducing acoustic echo effect comprising:

forming a first member of a microphone boot;

forming a second member of a microphone boot;

interposing a microphone within a cavity formed by the first member of the microphone boot and the second member of the microphone boot;

applying a compressive force to the first member of the microphone boot and the second member of the microphone boot so as to form an acoustic seal between the first member of the microphone boot and the second member of the microphone boot at an interface thereinbetween; and interposing a conductor between the first member of the microphone boot and the second member of the microphone boot at the interface.

14. The method of claim 13 wherein said applying of said compressive force includes coupling a front housing member to a second housing member.

15. The method of claim 14 further comprising:

a flange of said microphone between said first member of said microphone boot and said second member of said microphone boot at said interface region.

16. A microphone boot system for reducing acoustic echo effect comprising:

a first compression structure;

a first member of a microphone boot juxtaposed against the first compressive structure;

a second member of the microphone boot pressing against the first member of the microphone boot at an interface;

a microphone interposed within a cavity formed by the first member of the microphone boot and the second member of the microphone boot;

a second compression structure juxtaposed against the second member of the microphone boot;

an acoustic seal formed all along the interface and around the microphone; and an electrical conductor coupled to the microphone, member of the microphone boot and the second member of the microphone boot at the interface.

17. The microphone boot system of claim 16 wherein the first member of the microphone boot and the second member of the microphone boot is made of acoustically insulating material.

* * * * *